United States Patent
Gottschlich et al.

(10) Patent No.: US 10,198,335 B2
(45) Date of Patent: Feb. 5, 2019

(54) DETECTING ROOT CAUSES OF USE-AFTER-FREE MEMORY ERRORS

(71) Applicant: Intel Corporation, Santa Clara, CA (US)

(72) Inventors: Justin E Gottschlich, San Jose, CA (US); Gilles A Pokam, Fremont, CA (US); Cristiano L Pereira, Groveland, CA (US); Michael F Spear, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 15/274,481

(22) Filed: Sep. 23, 2016

(65) Prior Publication Data
US 2018/0089007 A1 Mar. 29, 2018

(51) Int. Cl.
*G06F 11/07* (2006.01)
*G06F 11/30* (2006.01)

(52) U.S. Cl.
CPC ........ *G06F 11/3051* (2013.01); *G06F 11/073* (2013.01); *G06F 11/079* (2013.01); *G06F 11/0775* (2013.01); *G06F 11/3034* (2013.01)

(58) Field of Classification Search
CPC ....... G06F 11/073; G06F 11/079; G06F 21/52
See application file for complete search history.

(56) References Cited

U.S. PATENT DOCUMENTS

| | | | | |
|---|---|---|---|---|
| 2005/0289404 A1* | 12/2005 | Maguire | ............. | G06F 11/0748 714/57 |
| 2006/0155525 A1* | 7/2006 | Aguilar, Jr. | ......... | G06F 17/5022 703/26 |
| 2010/0262967 A1* | 10/2010 | Eisen | ...................... | G06F 9/485 718/102 |
| 2016/0026791 A1* | 1/2016 | Melski | ................... | G06F 21/54 726/25 |

\* cited by examiner

*Primary Examiner* — Jigar P Patel
(74) *Attorney, Agent, or Firm* — Schwegman Lundberg & Woessner, P.A.

(57) ABSTRACT

Methods, systems, and computer programs are presented for detecting the root cause in use-after-free (UAF) memory corruption errors. A method includes an operation for tracking access to memory by a program to detect access to memory not allocated by the program. The method further includes operations for tracking allocations and deallocations of memory by the program, and for storing, in response to detecting a deallocation of memory by the program, at least part of a state of a program stack at a time of the deallocation of memory. Further, the method includes an operation for detecting, after the deallocation, access by the program to the memory associated with the deallocation of memory. In response to the detecting, the state of the program stack is saved in permanent storage at the time of the deallocation.

22 Claims, 10 Drawing Sheets

MEMORY REFERENCE EVENTS

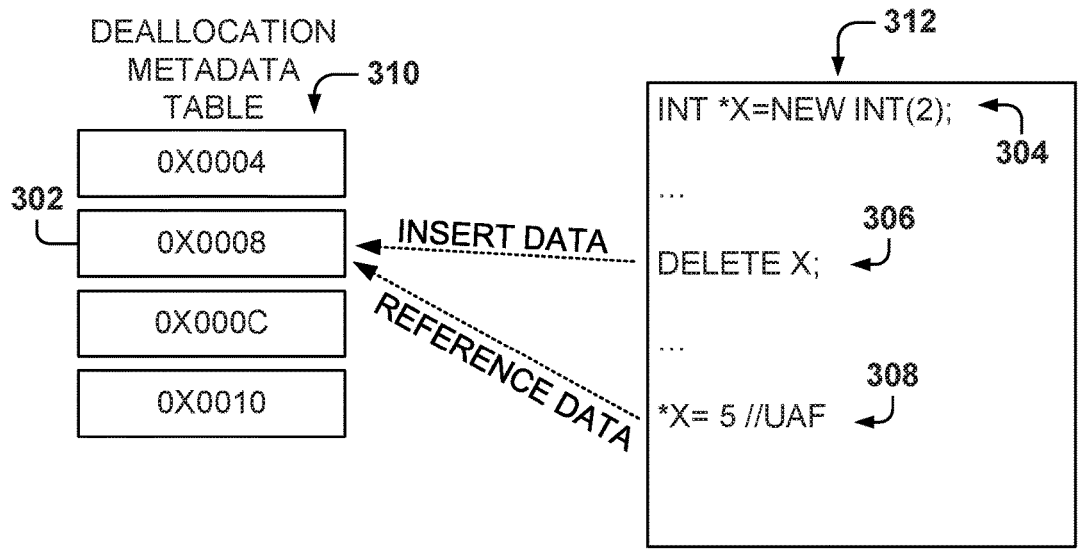

Fig. 3

DEALLOCATION METADATA TABLE 310

| FIELD | SIZE | DESCRIPTION |
| --- | --- | --- |
| THREAD ID | 32/64 BITS | CONTAINS THREAD ID OF THREAD THAT PERFORMED DELETE OPERATION |
| INSTRUCTION POINTER | 32/64 BITS | CONTAINS THE INSTRUCTION POINTER (IP) OF THE DELETE OPERATION |
| CALL STACK INFORMATION | VARIABLE | CONTAINS PARTIAL CALL STACK INFORMATION AT THE POINT OF THE DELETE OPERATION |
| TRACE INFORMATION | VARIABLE | INCLUDES LAST BRANCH TRACE RECORD (LBR) / PT TRACE (CIRCULAR BUFFER TRACKING INFORMATION, SIZE CONTROLLED BY HEURISTIC OR USER INPUT |

DETECTING ROOT CAUSES OF USE-AFTER-FREE MEMORY ERRORS

TECHNICAL FIELD

The subject matter disclosed herein generally relates to methods, systems, and programs for troubleshooting program memory execution errors, and more particularly, methods, systems, and computer programs for detecting the root cause in use-after-free (UAF) memory-access errors.

BACKGROUND

Oftentimes, computer programs allocate and deallocate (e.g., reserve and release) memory dynamically during execution. However, if the program has a bug, the memory management may cause problems related to inappropriate use of memory, such as the use of memory that does not belong to the computer program, or trying to access memory that has been deallocated.

Memory-corruption errors may be classified into two categories: performance errors and correctness errors. Performance errors are errors that lower the expected performance of a computer program, although the program may still operate correctly, just slower. Correctness errors are errors where the program is behaving incorrectly, such as by inappropriately accessing memory.

BRIEF DESCRIPTION OF THE DRAWINGS

Various ones of the appended drawings merely illustrate example embodiments of the present disclosure and cannot be considered as limiting its scope.

FIG. 3 illustrates the use of a deallocation metadata table, according to some example embodiments.

FIG. 4 is a reallocation metadata table, in accordance with some example embodiments.

DETAILED DESCRIPTION

Example methods, systems, and computer programs are directed to detecting the root cause in use-after-free (UAF) memory corruption errors. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Use-after-free (UAF) errors or bugs are errors created when a program tries to access a memory location that has been previously freed by the program. UAF errors are usually difficult to detect because very often the UAF error is observed a long time after the instruction that caused the error was executed. This means that there may be no information available to assist the programmer in diagnosing the error with respect to the state of the program when the root cause of the bug was executed.

Memory corruption bugs, also referred to as memory corruption errors, are bugs that occur when a memory location is unintentionally modified or accessed due to a programming error. Memory corruption bugs may be broadly classified into four different types: access to uninitialized memory, buffer underflow or overflow, memory leaks, and access to none-owned memory. Example embodiments presented herein describe solutions for none-owned memory bugs, and more specifically, bugs related to UAF bugs, which occur when memory is deallocated and then accessed after being deallocated. UAF bugs are one of the hardest type of bugs to diagnose and troubleshoot because the error may occur a long period of time before the error is detected.

In some example embodiments, information is gathered during program execution to assist a programmer when a UAF bug is detected. The system captures program state information when memory is deallocated, where the program state information includes program-stack information and program-branching information. When the UAF bug is detected, the captured program state information is provided to the user, which may then identify how the memory was deallocated and troubleshoot the problem. For example, the problem may occur because the memory shouldn't have been deallocated, or because the memory shouldn't have been accessed after being freed.

Figure 1:
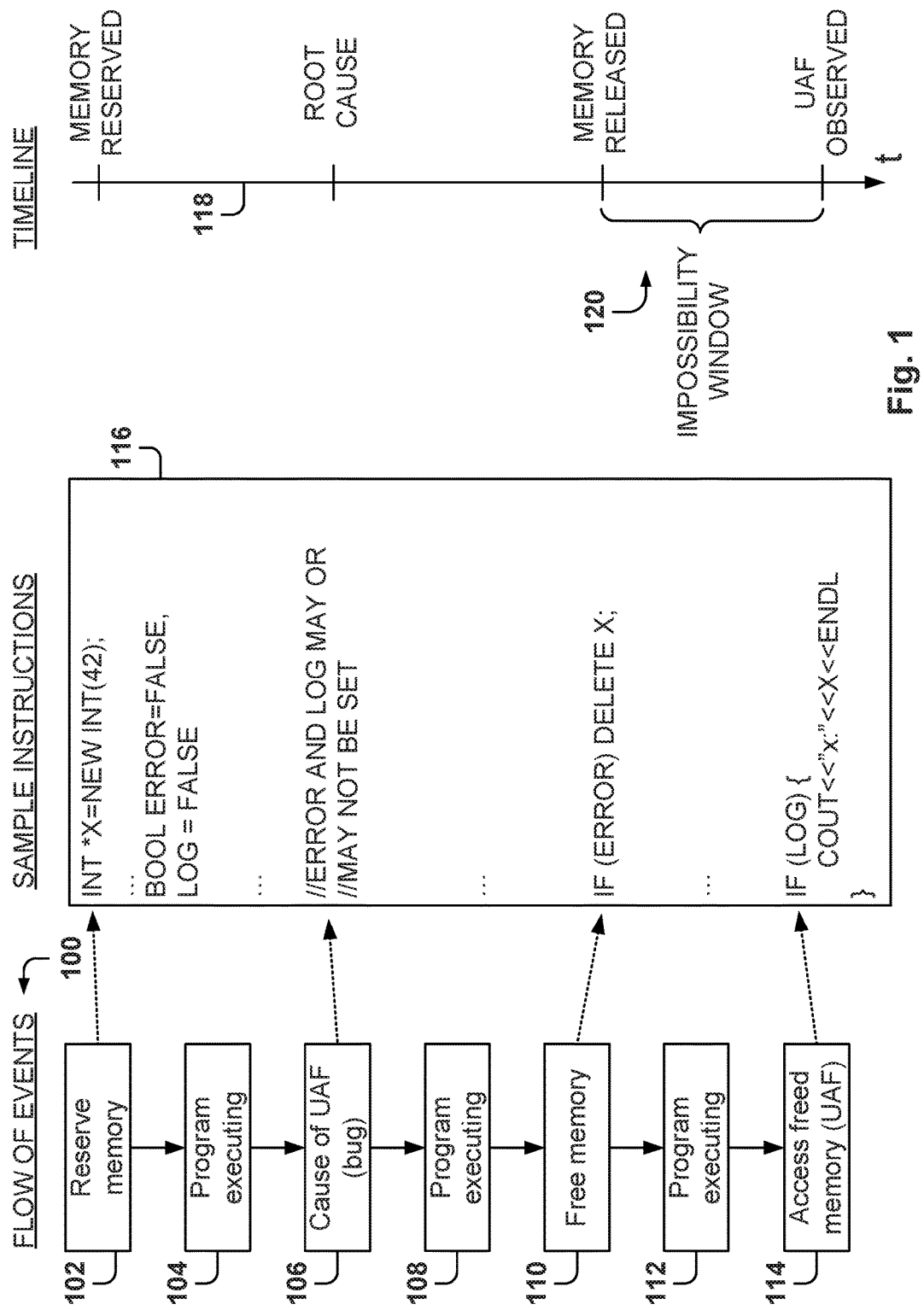
FIG. 1 illustrates the sequence of events that result in a use-after-free (UAF) memory access, according to some example embodiments.

FIG. 1 illustrates the sequence of events that result in a use-after-free (UAF) memory access, according to some example embodiments. It is often difficult to identify the root cause of UAF errors for at least two reasons. First, the distance between the deallocation and the future use may be many instructions apart. Second, the actual deallocation of the memory is, in many cases, not the actual root cause of the UAF memory corruption.

Sample instructions 116 are for a program that includes a UAF error. A flow of events 100 highlights some of the operations that cause the UAF error. At operation 102, memory is reserved, corresponding to the instruction "int *x=new int(42);". In addition, flags "error" and "log" are initialized by the program.

After the memory is reserved in operation 102, the program continues executing at operation 104. At operation 106, the UAF error is caused because any of the flags error or log are not set correctly. The program continues executing at operation 108, and at operation 110 the memory reserved in operation 102 is freed, as indicated by the instruction "if (error) delete x;". At this point, the flag error is true so the memory "x" is deallocated.

The program continues executing in operation 112 and at operation 114 the memory that was deallocated is referenced. During instruction "if (log) {cout<<"x:

"<<x<<endl}" the memory is accessed because the log flag is true. This is where the UAF error is detected because this memory shouldn't have been accessed. At this point, the program generally crashes, depending on how memory management is set for handling the error.

There's always a root cause for a UAF error, but the root cause is not always observed when it happens. Even if the program is executed again, the UAF error may not always occur or may appear in a different place during execution. This could happen because of the use of non-deterministic memory allocators, which do not guarantee that the program always gets memory the same way (for example, for security reasons), or because of non-deterministic execution, that may be a result, for example, of having multi-threaded programs.

In our example, the question is, what is the cause of the UAF error? The error may be that the delete operation was performed when the error flag was true, or the error may be that the memory was accessed when the flag log was true, or both.

It is up to the programmer to determine the root cause because the programmer understands the program's semantics and intended purpose. The embodiments presented herein give information to the programmer about the state of the program when the memory is deallocated. In addition, the programmer will typically have access to the state of the program at operation 114, because the program will crash and the state of the program will be logged.

The embodiments presented herein present a system that assists the programmer in identifying potential root cause locations to greatly reduce the burden for the programmer in finding the actual root causes of UAF errors.

Timeline 118 highlights some of the events associated with the UAF bug, including memory reserved 102, root cause 106, memory released 110, and UAF observation 114. There is a window of time, referred to as the impossibility window 120, between freeing the memory 110 and observing the UAF 114.

The root cause 106 takes place before the impossibility window 120 because the time before the memory is released is the time where memory could have been accessed correctly.

It is noted that, if the UAF error is due to an improper access at operation 114, it is easy to troubleshoot because the programmer has all the information available when the program crashed. The hard UAF errors to detect are where the root cause takes place before the impossibility window 120.

Figure 2:
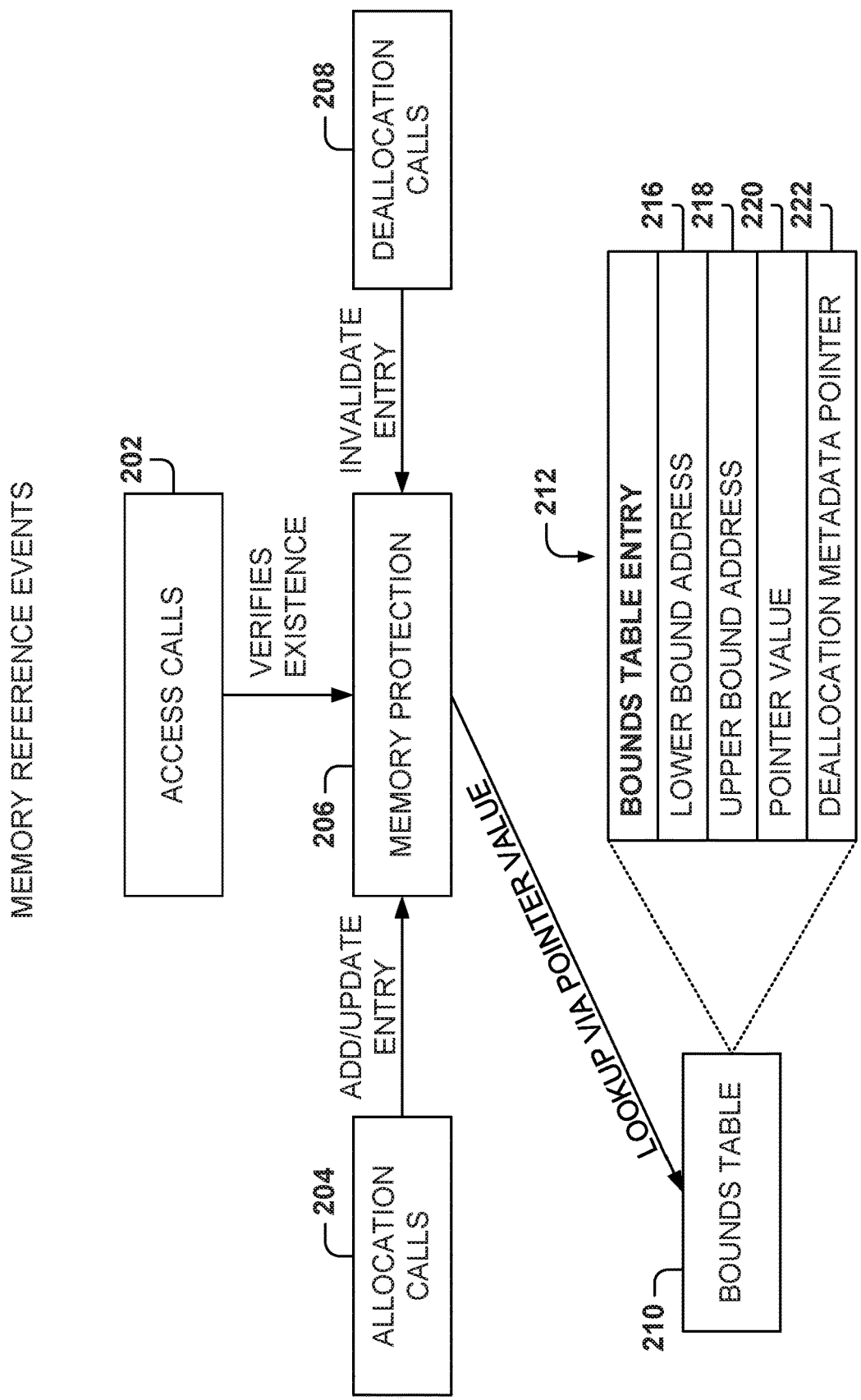
FIG. 2 is a diagram illustrating memory reference events according to an example embodiment.

FIG. 2 is a diagram illustrating memory reference events according to an example embodiment. A memory protection system 206 manages the allocation of memory and stores information related to the allocation and deallocation of memory.

In an example embodiment, the memory protection system 206 is the MPX (Memory Protection Extensions) system from Intel®. MPX is a set of extensions to the x86 instruction set architecture, and provides increased security to software by checking pointer references to memory and detect buffer underflow and overflow. The principles presented herein may be applied to any such memory protection system.

The memory protection system 206 manages access calls 202, allocation calls 204, and deallocation calls 208. The access calls 202 are used to verify the existence of memory locations. The allocation calls 204 are used to allocate memory or to update existing memory allocations. The deallocation calls 208 are used to invalidate entries, e.g., release the memory previously reserved.

In an example embodiment, the memory protection system 206 includes a bounds table 210 used to track the memory allocations. A bounds table entry 212 of the bounds table 210 includes a lower bound address 216, an upper bound address 218, a pointer value 220, and a deallocation metadata pointer 222.

The lower bound address 216 and the upper bound address 218 identify the boundaries of the block of memory allocated, and the pointer value 220 includes information related to the memory block. Having the lower bound address 216 and the upper bound address 218 assist in detecting the occurrence of the UAF error, but they do not help in detecting the root cause of the UAF error.

The deallocation metadata pointer 222 is a pointer to an entry in the deallocation metadata table 310, described in more detail below with reference to FIGS. 3 and 4. The deallocation metadata table 310 is where the program state is saved at the time when the deallocation of memory is performed.

FIG. 3 illustrates the use of the deallocation metadata table 310, according to some example embodiments. A program 312 includes instructions for allocating memory 304, deallocating memory 306, and for a UAF access 308.

When the memory is allocated, an entry 302 is created in the deallocation metadata table 310 to reserve space for saving program-state information when the memory is deallocated. Therefore, when the memory is deallocated by instruction 306, data associated with the state of the program is inserted within the deallocation metadata table 310 in the corresponding entry 302.

Later, when the instruction 308 creates the UAF error, the program-state information stored in entry 302 is saved in permanent storage to allow the programmer access to this data during troubleshooting. In an example embodiment, the program-state information stored in entry 302 is presented on a display. As used herein, permanent storage refers to any computer-readable medium where the information stored in the permanent storage is not lost if the system where the permanent storage resides is powered off. Examples of permanent storage include a hard drive, a solid-state drive, a network drive, a non-volatile RAM, etc. In some embodiments the program-state information may also be save in RAM or any other type of memory as long as access to the program-state information is available to the programmer.

The program-state information is provided to the programmer in a traditional debug-like format, showing the deallocation instruction associated with the UAF bug, a constrained call stack (as specified by the user, a heuristic, or the OS), branch trace information, and thread information. With this information, the programmer may then build a general picture of the program's execution at the deallocation site, which will assist in the identification of the root cause of the UAF bug.

FIG. 4 is the deallocation metadata table 310, in accordance with some example embodiments. In an example embodiment, the memory manager system gathers data for the deallocation metadata table 310 at runtime through software, capturing runtime program state information. The amount of data stored in the deallocation metadata table 310 is configurable by the programmer, who has the ability to configure the system in order to gather more or less data, while controlling the overhead incurred to store this data. Field experimentation has shown that keeping limited program state data still provides enough information to resolve a majority of the USF errors.

In an example embodiment, the following metadata is captured in the deallocation metadata table 310 at each deallocation event:

- a thread identifier of the thread that performed the deallocation (e.g., delete) operation. In some embodiments, the thread identifier is 32 or 64 bits in size, but other sizes are also possible;
- an instruction pointer pointing to the instruction that performed the delete operation. In some embodiments, the instruction pointer is 32 or 64 bits in size, but other sizes are also possible;
- call stack information containing partial information of the call stack of the executing program at the point of the delete operation. More details about the stack information saved are provided below with reference to FIG. 5. The amount of call stack information saved is configurable by the programmer; and
- trace information including a last branch trace record (LBR) of branches taken by the executing program. The trace information includes information regarding branches taken by the program during executing, such as program instruction pointer jumps due to IF statements or other types of statements that cause the linear flow of execution to be altered. In an example embodiment, the partial trace information is stored in a circular buffer, such that new entries in the LBR replace old entries after the buffer is full. In an example embodiment, the amount of trace record information saved is configurable by the programmer. In another example embodiment, the amount of trace record information saved is determined by heuristics configurable by the system based on past performance and current resource utilization.

It is noted that the embodiments illustrated in FIG. 4 are examples and do not describe every possible embodiment. Other embodiments may utilize different fields, store additional data or fewer data, etc. The embodiments illustrated in FIG. 4 should therefore not be interpreted to be exclusive or limiting, but rather illustrative.

One of the goals is to store enough information to assist the programmer in troubleshooting the UAF error. For example, in multithreaded programs, it is useful to know which thread deallocated the memory, which may be the same thread or a different thread from the one that caused the UAF error. Further, the instruction pointer identifies exactly the instruction that released the memory.

The stack information and the trace information let the user know how the program executed. That is, they provide a history to the programmer related to the deallocation instruction. Since the cause of the error may happen far away in time from the UAF detection, if the stack and trace information were not saved, the programmer would have no insight on the state of the program when the deallocation took place.

Because both the call stack information and the trace information are size-controllable—either by the programmer, the program invocation, the operating system, or by an automated heuristic—the amount of overhead incurred by the memory management system may be adjusted for various types of environments, such as those used in development and testing or those used in production. This flexibility allows the system to be fully detailed in pre-production software development environments, where the entire call stack, or a large portion of it, and branch trace information may be captured per deallocation, while being constrained in production (e.g., deployed) software environments to those parameters that are acceptable for a given environment. In some production environments, the deallocation information capture may be turned off.

In some example embodiments, if the memory that was released is reallocated, then the same entry 302 in the deallocation metadata table 310 is utilized, which stops the memory-tracking system from increasingly requiring more storage. Further, it is noted that adding the deallocation metadata table 310 does not require additional specialized hardware for the existing memory management system.

Figure 5:
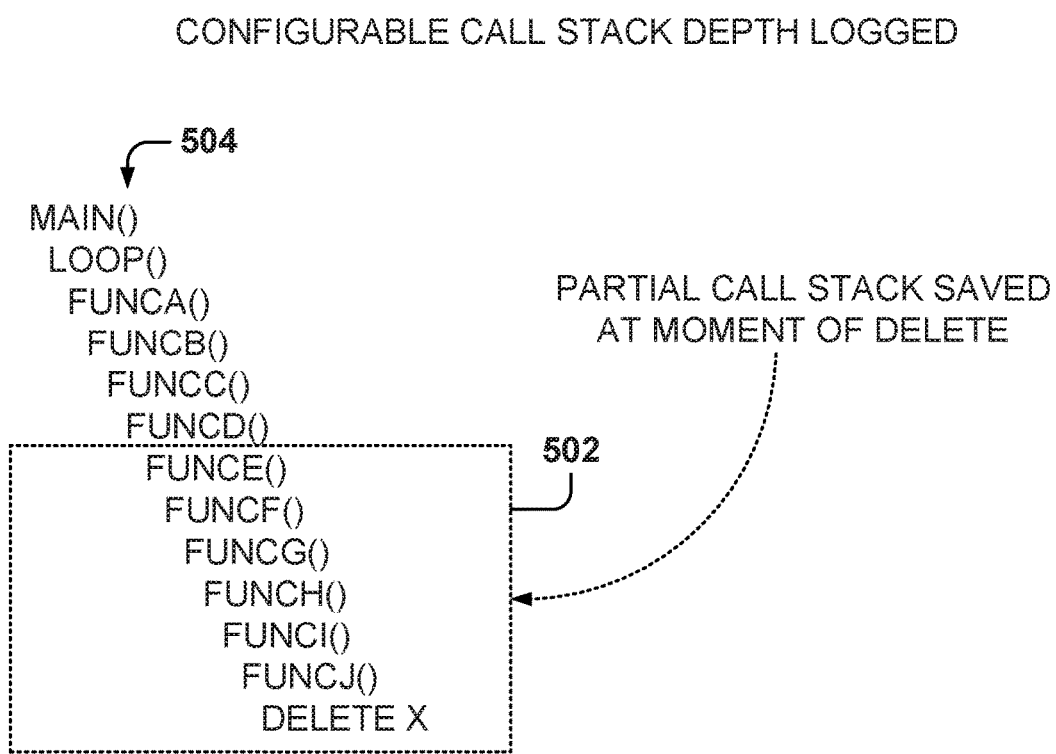
FIG. 5 illustrates the logging of call stack information, according to some example embodiments.

FIG. 5 illustrates the logging of call stack information, according to some example embodiments. During program execution, a program (e.g., main function) may call another function (e.g., loop function), which may call another function, that calls another function, and so forth. The program stack 504 keeps the information on the calls made so when a function exists, the program goes back to the parent function that invoked the exiting function.

In some environments, the call stack 504 may run into the hundreds of calls, but usually, the most useful information resides at the top of the stack where the most recent function calls are kept. In some example embodiments, when the deallocation takes place, only a partial segment of the stack 502 is kept in the deallocation table 310, although it is also possible to store the complete stack in some embodiments.

In the example of FIG. 5, the stored partial call stack information 502 includes the most recent six function calls, but other embodiments may utilize a different number of function calls. For example, the number of function calls saved may be in the range from 10 to 100, but other values are also possible, even storing the complete stack, which may be useful in testing environments, although the system performance may suffer. As the stack goes up, the information provided by the stack tends to be less informative and more routine.

As long as the symbol information is available, it is possible to match the stack information to the actual source code to see the functions that were invoked. A reverse symbol lookup is performed to provide this information. In some cases, programmers do not release the symbol information table with the program, so the stack information is stored in permanent memory so it may be later checked by the programmer in an environment where the symbol information table is available.

Similarly, the branch trace information may be configured to store a different number of branching operations. In some example embodiments, the number of branches stored may be in the range from 5 to 100, but other values are also possible. In addition, in some embodiments, the branch-stored information may be controlled by heuristics based on past measurements, resource availability, and system performance.

It is noted that in some example embodiments, both the call stack information 502 and the branch trace information are stored, but in other example embodiments, one or the other type of information is stored.

Figure 6:
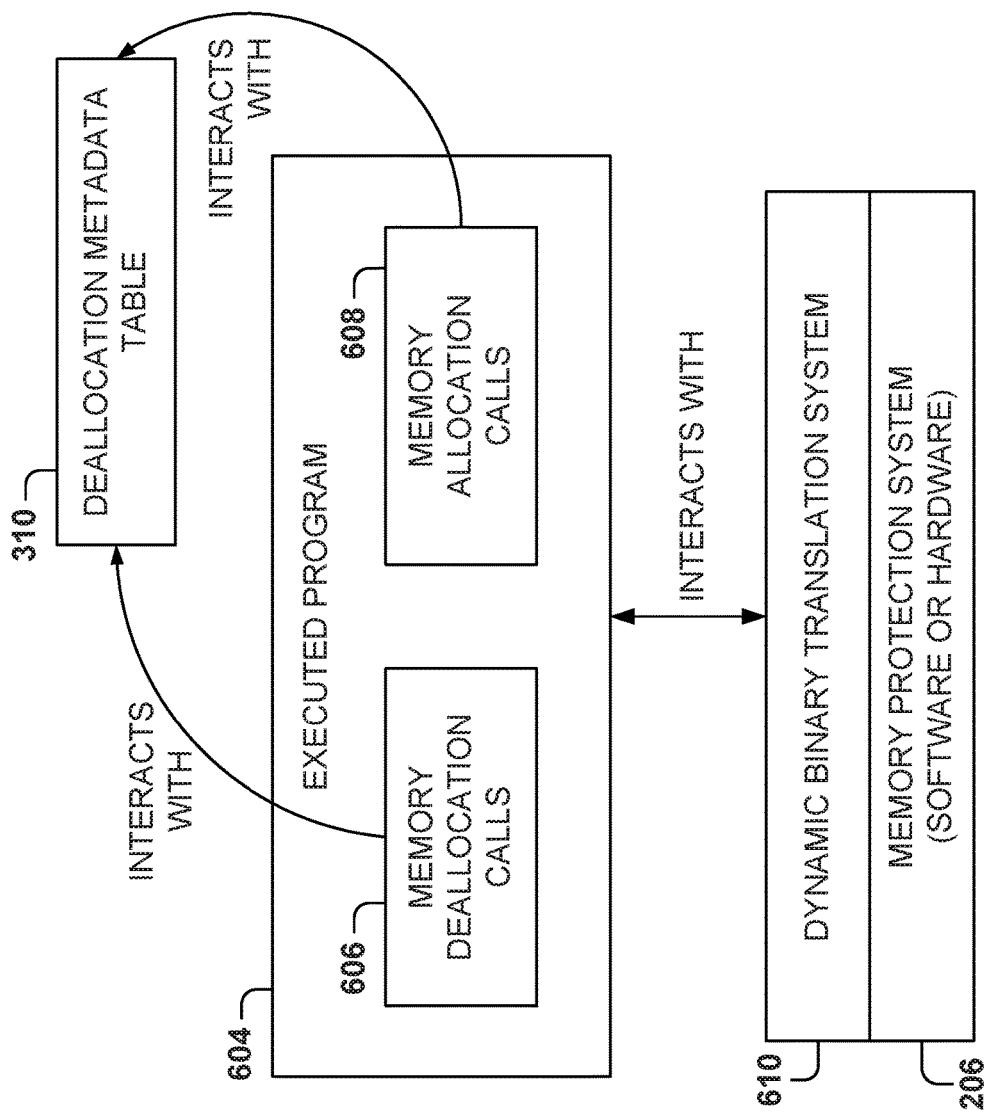
FIG. 6 is a diagram illustrating the interactions associated with memory operations, according to some example embodiments.

FIG. 6 is a diagram illustrating the interactions associated with memory operations, according to some example embodiments. The memory protection system 206 is configured to detect the UAF errors. The memory protection system 206 back-traces to the deallocation site for the memory location related to the UAF 114 and presents the programmer with detailed program information events that transpired prior to the deallocation of the memory.

The executed program 604 includes memory allocation calls 608 and memory deallocation calls 606. In some example embodiments, in order to capture important deallocation metadata, the memory protection system 206 injects instructions at the deallocation sites per deallocated memory. Some of the data gathering may be performed statically at compiler time by injecting additional code into the program's memory deallocator (e.g., free( )). However, some operations are performed dynamically, ideally by a binary translator, that intercepts calls to free( ) and performs the pre-, or post-, operations to capture the metadata, such as call-stack and branch-trace information.

The dynamic binary translation system 610 provides the metadata used to interpret the call stack 502 and trace information, such as the symbol table. Some of this data may be part of the computational model for certain architectures (e.g., last branch record, which provides users with prior branches for certain computer architectures). However, because this information is not reliably present for all machines, the dynamic binary translation system 610 is utilized to capture both the call stack 502 and branch trace information for all types of machines.

As discussed above, the data in the deallocation metadata table 310 is utilized to log critical call stack 502 and branch trace information at the point of each deallocation, which is reflective of past events leading up to the deallocation. This information is subsequently used to identify the root cause of any UAF bug once such a bug is observed. Because UAF root causes cannot occur after the memory has been deallocated (as shown above in FIG. 1), no logging of behavior between a memory's deallocation and the emergence of its respective UAF bug is necessary.

It is noted that because of the additional data storage, delete operations utilize more resources, such as 50% more CPU. However, delete operations are not very common, so the resulting overhead in the overall system performance is expected to be low. Further, it is noted that the branch trace information is already captured by the hardware on some existing systems, so no additional resources are needed for these systems.

Figure 7:
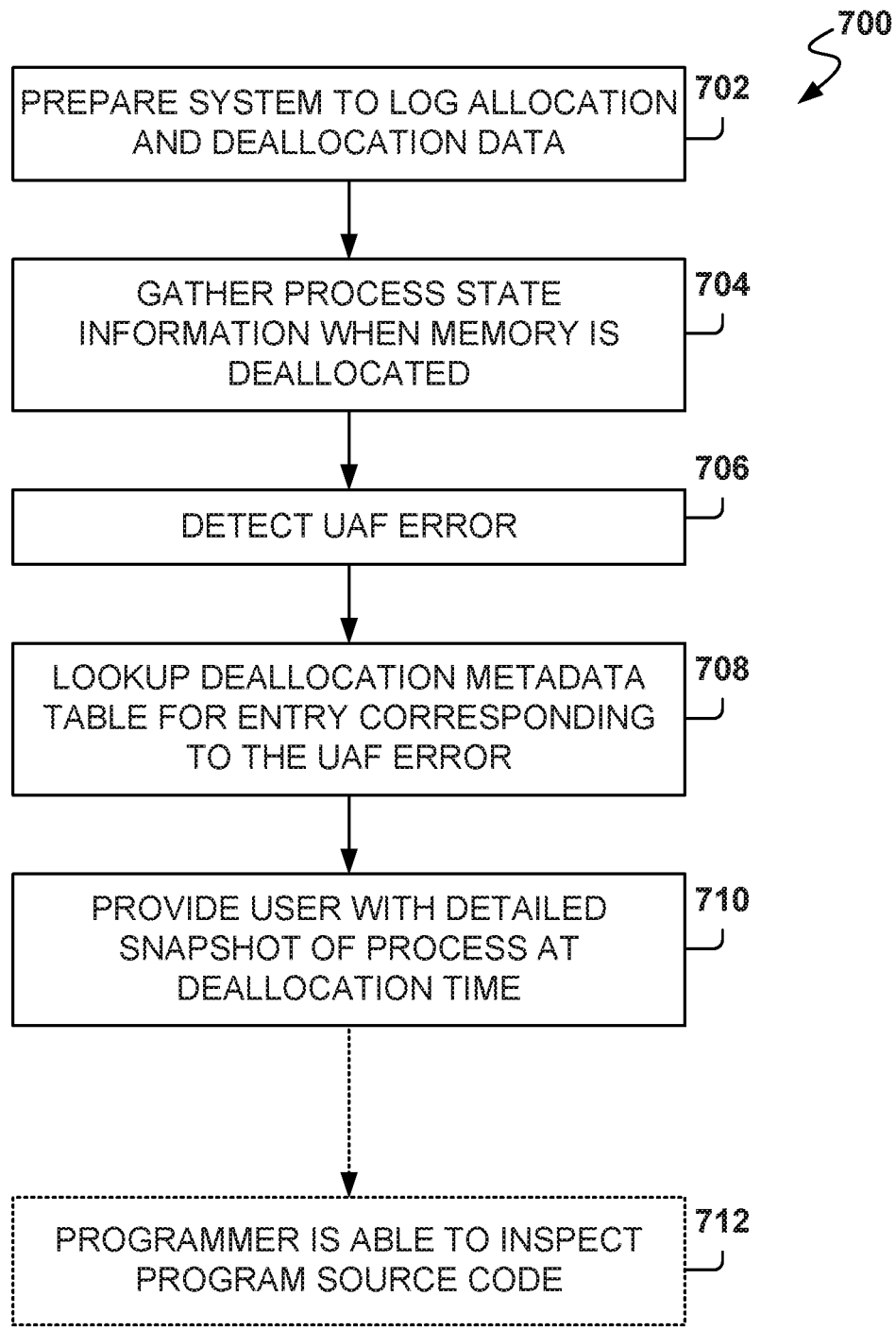
FIG. 7 is a flowchart of a method, according to some example embodiments, for detecting UAF errors.

FIG. 7 is a flowchart of a method, according to some example embodiments, for detecting UAF errors. While the various operations in this flowchart are presented and described sequentially, one of ordinary skill will appreciate that some or all of the operations may be executed in a different order, be combined or omitted, or be executed in parallel.

At operation 702, the memory protection system 206 is prepared for logging allocation and deallocation data. The allocation and deallocation sites of the executing program are augmented such that each deallocation operation inserts the appropriate call stack 502, and branch trace information. This may be achieved in a variety of ways, such as by modifying the allocation and deallocation call sites within the compiler, or intercepting such calls via binary translation.

Operation 704 is for gathering the call stack 502 and branch trace information, as well as debugging information at dynamic program execution time. This data is stored at each memory deallocation. When the same memory locations are subsequently reallocated, the prior debug deallocation information is cleared.

From operation 704, the method flows to operation 706 where the UAF error is detected. Further, from operation 706, the method flows to operation 708, where a lookup on deallocation metadata table 310 is performed to identify the table entry 302 whose memory corresponds to the memory location related to the observed UAF error. At operation 708, the information is provided to the user. The user has access to a detailed snapshot of the deallocation data for the detected UAF error.

The programmer is able, in operation 712, to inspect the source code to cross-correlate the executed deallocation and its past events (via the call stack 502 and the branch trace information) to discern the root cause of the UAF 114.

Figure 8:
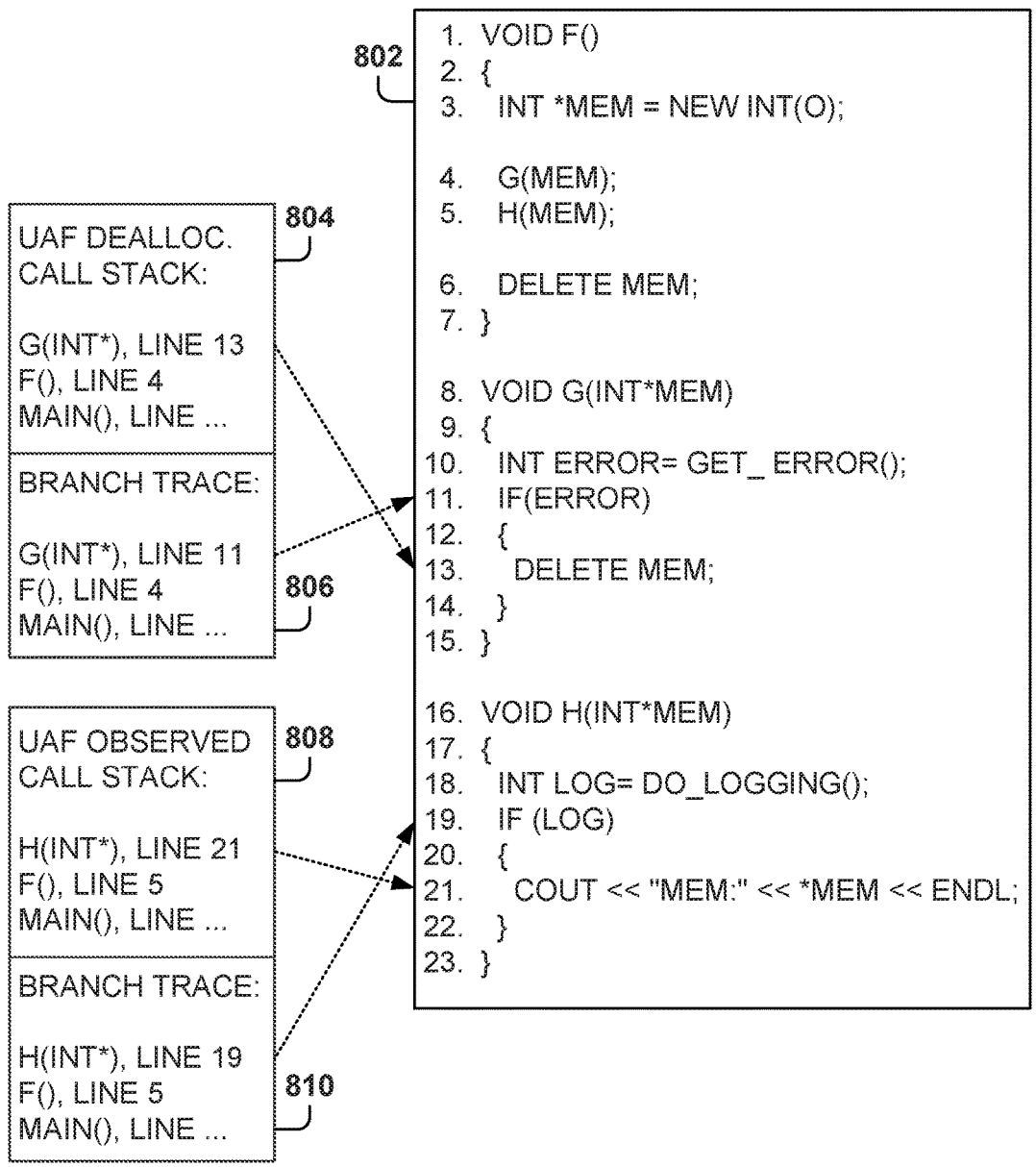
FIG. 8 is an example for logging deallocation data, according to some example embodiments.

FIG. 8 is an example for logging deallocation data, according to some example embodiments. In the example embodiment illustrated in FIG. 8, a main program 802 includes allocation and deallocation instructions, as well as an UAF error at line 21. The main program 802 includes, at least, three functions: f( ) g( ), and h( ). The f( ) function reserves memory to be referenced by pointer mem, and then calls functions g(mem) followed by h(mem).

The g( ) function includes a conditional statement on line 11, and if the condition is true then a delete operation is executed on line 13. Therefore, when the delete operation is executed on line 13, the UAF deallocation call stack 804 includes the stack information, which in this simplified example includes the g( ) function at line 13, the f( ) function on line 4 which called the g( ) function, and the main( ) function which called the f( ) function at a certain line (not shown).

The branch trace 806 includes the branch information, and in this example, the branch trace 806 includes the branch taken at line 11 of the conditional statement of the g( ) function, the f( ) function at line 4 that called the g( ) function, and the main( ) function that called the f( ) function.

Therefore, the branch trace information includes changes in the sequential flow of execution of a program that are due to function calls, conditional statements, or other program instructions that break the incremental flow of the instruction pointer.

The UAF error is detected at line 21 of the h( ) function, which includes a conditional statement at line 19. Once this point in the execution is reached, the UAF detection system triggers an event that breaks the execution and points the programmer to line 21, where the UAF bug occurred.

Once the UAF error is detected, the current state of the program is also stored in memory. The UAF observed call stack 808 includes function h( ) at line 21 (the line that includes the UAF memory access), which was called by function f( ) at line 5, which was called by the main program 802.

The branch trace 810 includes the branch taken by the conditional statement on the line 19. Therefore, the branch trace 810 includes the h( ) function at line 19 (where the branch statement took place), the f( ) function at line 5 (where the call to the h( ) function was made), and the main( ) program that called the f( ) function.

The memory protection system 206 stores the program state in memory to allow the programmer access to information about the two detailed snapshots of the program's execution. By using these two pieces of information together, the programmer may decide how to fix the bug based on the semantics intended for the program. Because the memory protection system 206 highlights the debug information for not only the observed UAF memory corruption location, but also for its associated deallocation debug information, a programmer may, in many cases, see the causal link between the two events, enabling a quick fix to an otherwise extremely challenging memory corruption bug.

Figure 9:
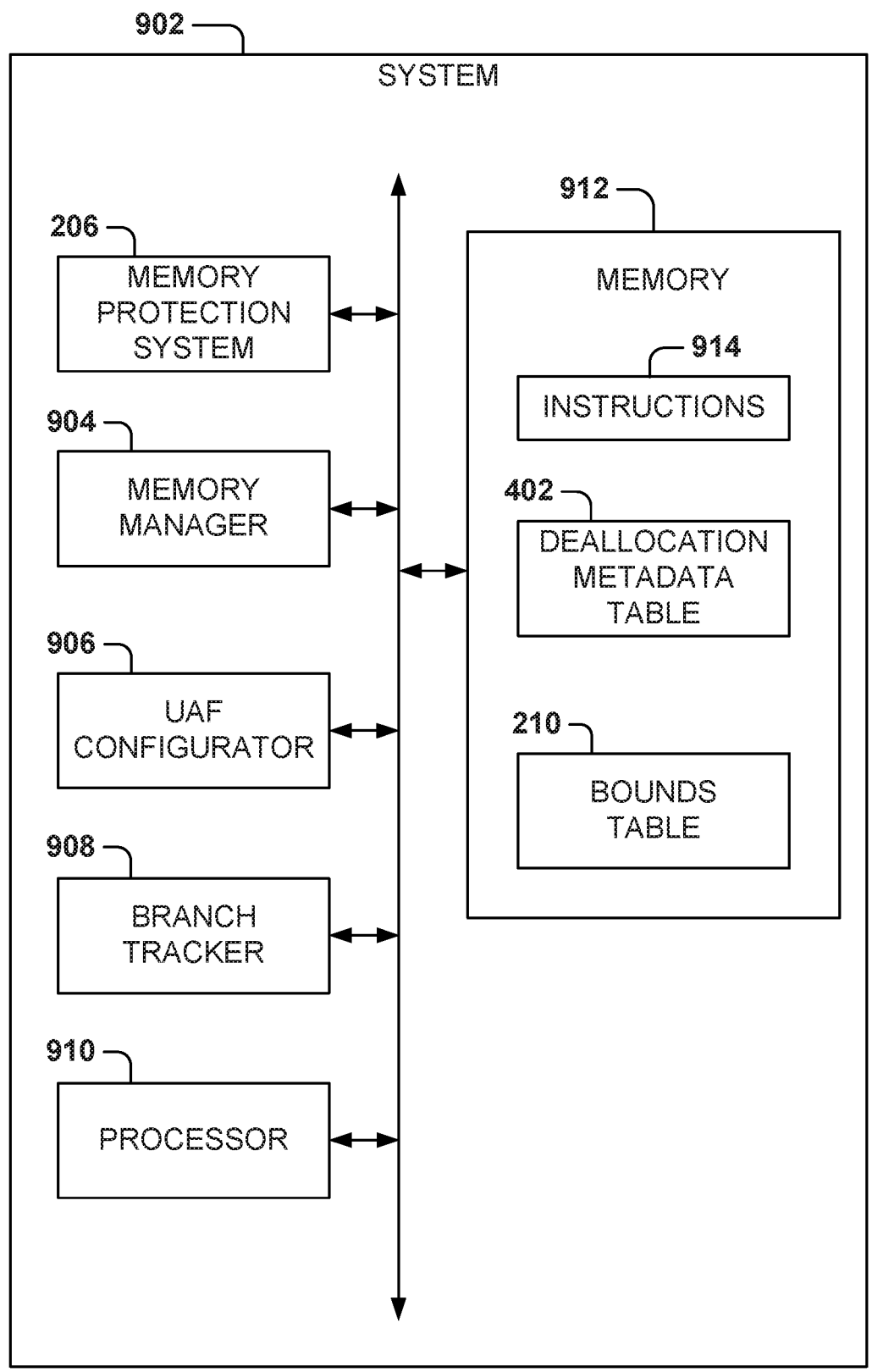
FIG. 9 is a system for implementing example embodiments.

FIG. 9 is a system 902 for implementing example embodiments. In an example embodiment, the system 902 includes a memory protection system 206, a memory manager 904, an UAF configurator 906, a branch tracker 908, a processor 910, and a memory 912.

The memory protection system 206 tracks the memory allocations and deallocations in order to detect out-of-bounds access to memory and to provide program state information in order to troubleshoot UAF errors, and other memory access errors.

The memory manager 904 manages the allocations of memory to programs and includes an interface (e.g., API) to allow programs executing on the system to request memory blocks and to deallocate the allocated memory blocks.

The UAF configurator 906 provides an interface providing options to configure UAF tracking information. In an example embodiment, the UAF configurator 906 includes one or more of the following options: number of functions in the call stack saved when a memory is deallocated, number of branches from the branch trace stored when the memory is deallocated, maximum size of storage used for storing call stack information 502, maximum size of storage used for branch trace information, a flag to select if the deallocation information is stored or not, a list of programs for tracking the program state during deallocation calls 606 (where programs that are not on the list will not be monitored).

The branch tracker 908 traces branch information during the execution of a program. In an example embodiment, the branch tracker 908 is implemented in hardware, but in other example embodiments, the branch tracker 908 may be implemented in software.

The memory 912 may include RAM, ROM, and permanent storage. In an example embodiment, the memory 912 is used by programs during execution. The memory 912 may also include program instructions 914 for programs executed by processor 910, the deallocation metadata table 402 (see FIG. 4), and the bounds table 210 (see FIG. 2).

Figure 10:
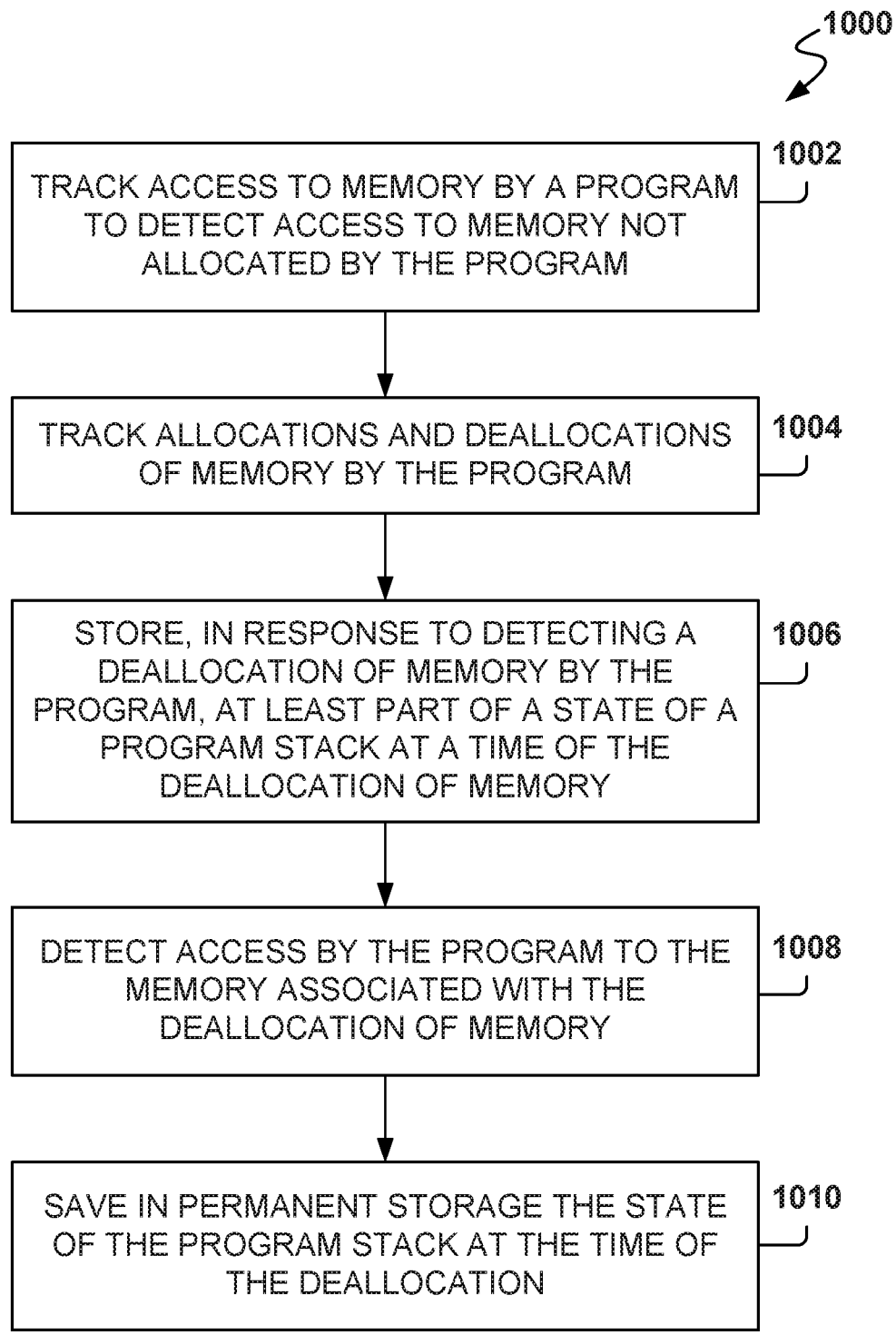
FIG. 10 is a flowchart of a method, according to some example embodiments, for detecting the root cause in UAF memory access errors.

FIG. 10 is a flowchart of a method, according to some example embodiments, for detecting the root cause in UAF memory access errors. While the various operations in this flowchart are presented and described sequentially, one of ordinary skill will appreciate that some or all of the operations may be executed in a different order, be combined or omitted, or be executed in parallel.

At operation 1012, tracking is performed of the access to memory by a program to detect access to memory not allocated by the program. From operation 1002, the method flows to operation 1004 for tracking allocations and deallocations of memory by the program.

At operation 1006, in response to detecting a deallocation of memory by the program, at least part of a state of a program stack 504 at a time of the deallocation of memory is stored. From operation 1006, the method flows to operation 1008 for detecting, after the deallocation, access by the program to the memory associated with the deallocation of memory.

At operation 1010, in response to the detecting operation 1008, the state of the program stack 504 at the time of the deallocation is saved in permanent storage.

Figure 11:
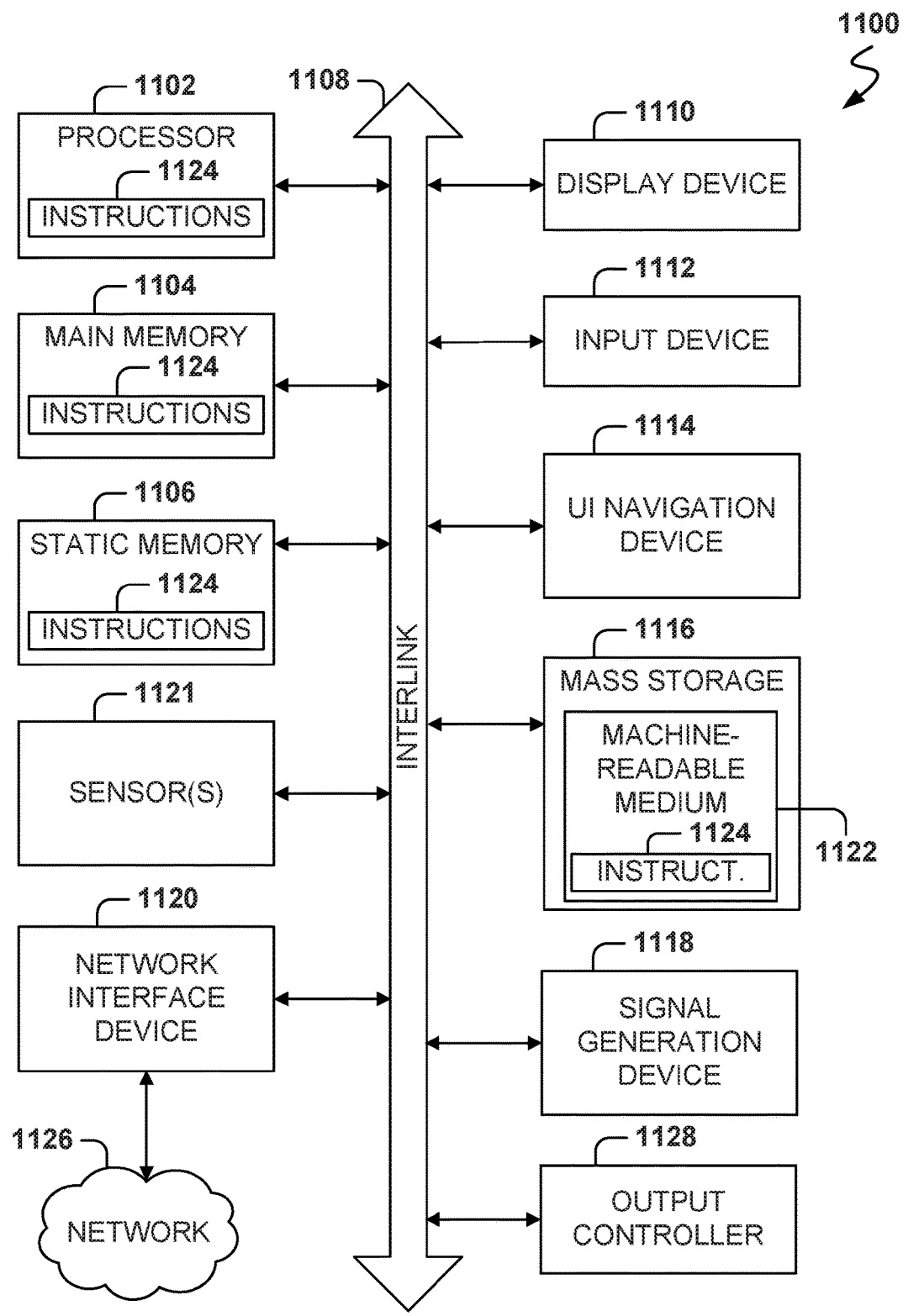
FIG. 11 is a block diagram illustrating an example of a machine upon which one or more example embodiments may be implemented.

FIG. 11 is a block diagram illustrating an example of a machine 1100 upon which one or more example embodiments may be implemented. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions 1124 for execution by the machine 1100 and that cause the machine 1100 to perform any one or more of the techniques of the present disclosure, or that is capable of storing, encoding or carrying data structures used by or associated with such instructions 1124. Non-limiting machine readable medium examples may include solid-state memories, and optical and magnetic media. In an example, a massed machine readable medium comprises a machine readable medium 1122 with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1124 for execution by the machine 1100, and includes digital or analog communications signals or other intangible medium to facilitate communication of such software.

ADDITIONAL NOTES & EXAMPLES

Example 1 is a system for tracking memory usage, the system comprising: a memory protection system to: track access of a program to memory to detect access to memory not allocated by the program; track allocations and deallocations of memory initiated by the program; store, in response to detecting a deallocation of memory by the program, at least part of a state of a program stack at a time of the deallocation of memory; detect, after the deallocation, access by the program to the memory associated with the deallocation of memory; and save in permanent storage, in response to the detection, the state of the program stack at the time of the deallocation.

In Example 2, the subject matter of Example 1 optionally includes wherein the memory protection system is further to: store, in response to detecting the deallocation of memory by the program, a lower bound and an upper bound of the memory associated with the deallocation; and store a deallocation metadata pointer that points to an entry in a deallocation metadata table.

In Example 3, the subject matter of Example 2 optionally includes wherein the entry in the deallocation metadata table comprises: a thread identifier of a thread that performed the deallocation; an instruction pointer to an instruction that performed the deallocation; and the program stack at the time of the deallocation.

In Example 4, the subject matter of Example 3 optionally includes wherein the entry in the deallocation metadata table further comprises: branch information related to instructions executed by the program before the deallocation.

In Example 5, the subject matter of any one or more of Examples 1-4 optionally include wherein the state of the program stack comprises between five and fifty of most recent function calls executed by the program.

In Example 6, the subject matter of any one or more of Examples 1-5 optionally include wherein the memory protection system is further to: provide an interface to configure how many of most recent function calls executed by the program are stored in the state of the program stack.

In Example 7, the subject matter of any one or more of Examples 1-6 optionally include wherein the state of the program stack comprises a name of a function and a line number within the function for each function call in the stored state of the program stack.

In Example 8, the subject matter of any one or more of Examples 1-7 optionally include wherein the memory protection system is further to: cause the saved state of the program stack at the time of the deallocation to be presented on a display.

In Example 9, the subject matter of any one or more of Examples 1-8 optionally include wherein the memory protection system is further to: store, in response to the detecting the deallocation of memory by the program, branch information related to instructions executed by the program before the deallocation of memory.

In Example 10, the subject matter of Example 9 optionally includes wherein the branch information comprises a name of a function and a line number within the function for a branch taken during execution of the program.

In Example 11, the subject matter of Example 10 optionally includes wherein the branch information comprises between five and fifty most recent branches taken during the execution of the program.

In Example 12, the subject matter of any one or more of Examples 1-11 optionally include wherein the memory protection system is further to: store the state of the call stack at a time of the detect access by the program to the memory associated with the deallocation.

In Example 13, the subject matter of any one or more of Examples 1-12 optionally include wherein the memory protection system is further to: access a symbol table to identify function names in the state of the program stack.

Example 14 is a method for tracking memory usage, the method comprising: tracking, using a memory protection system, access of a program to memory to detect access to memory not allocated by the program; tracking allocations and deallocations of memory initiated by the program; storing, in response to detecting a deallocation of memory by the program, at least part of a state of a program stack at a time of the deallocation of memory; detecting, after the deallocation, access by the program to the memory associated with the deallocation of memory; and saving in permanent storage, in response to the detecting, the state of the program stack at the time of the deallocation.

In Example 15, the subject matter of Example 14 optionally includes storing, in response to detecting the deallocation of memory by the program, a lower bound and an upper bound of the memory associated with the deallocation; and storing a deallocation metadata pointer that points to an entry in a deallocation metadata table.

In Example 16, the subject matter of Example 15 optionally includes wherein the entry in the deallocation metadata table comprises: a thread identifier of a thread that performed the deallocation; an instruction pointer to an instruction that performed the deallocation; and the program stack at the time of the deallocation.

In Example 17, the subject matter of Example 16 optionally includes wherein the entry in the deallocation metadata table further comprises: branch information related to instructions executed by the program before the deallocation.

In Example 18, the subject matter of any one or more of Examples 14-17 optionally include wherein the state of the program stack comprises between five and fifty of most recent function calls executed by the program.

In Example 19, the subject matter of any one or more of Examples 14-18 optionally include providing an interface to configure how many of most recent function calls executed by the program are stored in the state of the program stack.

In Example 20, the subject matter of any one or more of Examples 14-19 optionally include wherein the state of the program stack comprises a name of a function and a line number within the function for each function call in the stored state of the program stack.

In Example 21, the subject matter of any one or more of Examples 14-20 optionally include causing the saved state of the program stack at the time of the deallocation to be presented on a display.

In Example 22, the subject matter of any one or more of Examples 14-21 optionally include storing, in response to the detecting the deallocation of memory by the program, branch information related to instructions executed by the program before the deallocation of memory.

In Example 23, the subject matter of Example 22 optionally includes wherein the branch information comprises a name of a function and a line number within the function for a branch taken during execution of the program.

In Example 24, the subject matter of Example 23 optionally includes wherein the branch information comprises between five and fifty most recent branches taken during the execution of the program.

In Example 25, the subject matter of any one or more of Examples 14-24 optionally include storing the state of the call stack at a time of the detecting access by the program to the memory associated with the deallocation.

In Example 26, the subject matter of any one or more of Examples 14-25 optionally include accessing a symbol table to identify function names in the state of the program stack.

Example 27 is a system comprising means to perform any method of Examples 14 to 26.

Example 28 is at least one machine-readable media including instructions that, when executed by a machine, cause the machine to perform any method of Examples 14-26.

Example 29 is at least one machine readable medium including instructions that, when executed by a machine, cause the machine to: track, using a memory protection system, access of a program to memory to detect access to memory not allocated by the program; track allocations and deallocations of memory initiated by the program; store, in response to detecting a deallocation of memory by the program, at least part of a state of a program stack at a time of the deallocation of memory; detect, after the deallocation, access by the program to the memory associated with the deallocation of memory; and save in permanent storage, in response to the detection, the state of the program stack at the time of the deallocation.

In Example 30, the subject matter of Example 29 optionally includes wherein the instructions further cause the machine to: store, in response to detecting the deallocation of memory by the program, a lower bound and an upper bound of the memory associated with the deallocation; and store a deallocation metadata pointer that points to an entry in a deallocation metadata table.

In Example 31, the subject matter of Example 30 optionally includes wherein the entry in the deallocation metadata table comprises: a thread identifier of a thread that performed the deallocation; an instruction pointer to an instruction that performed the deallocation; and the program stack at the time of the deallocation.

In Example 32, the subject matter of Example 31 optionally includes wherein the entry in the deallocation metadata table further comprises: branch information related to instructions executed by the program before the deallocation.

In Example 33, the subject matter of any one or more of Examples 29-32 optionally include wherein the state of the program stack comprises between five and fifty of most recent function calls executed by the program.

In Example 34, the subject matter of any one or more of Examples 29-33 optionally include wherein the instructions further cause the machine to: provide an interface to configure how many of most recent function calls executed by the program are stored in the state of the program stack.

In Example 35, the subject matter of any one or more of Examples 29-34 optionally include wherein the state of the program stack comprises a name of a function and a line number within the function for each function call in the stored state of the program stack.

In Example 36, the subject matter of any one or more of Examples 29-35 optionally include wherein the instructions further cause the machine to: cause the saved state of the program stack at the time of the deallocation to be presented on a display.

In Example 37, the subject matter of any one or more of Examples 29-36 optionally include wherein the instructions further cause the machine to: store, in response to the detecting the deallocation of memory by the program, branch information related to instructions executed by the program before the deallocation of memory.

In Example 38, the subject matter of Example 37 optionally includes wherein the branch information comprises a name of a function and a line number within the function for a branch taken during execution of the program.

In Example 39, the subject matter of Example 38 optionally includes wherein the branch information comprises between five and fifty most recent branches taken during the execution of the program.

In Example 40, the subject matter of any one or more of Examples 29-39 optionally include wherein the instructions further cause the machine to: store the state of the call stack at a time of the detect access by the program to the memory associated with the deallocation.

In Example 41, the subject matter of any one or more of Examples 29-40 optionally include wherein the instructions further cause the machine to: access a symbol table to identify function names in the state of the program stack.

Example 42 is a system for tracking memory usage, the system comprising: means for tracking access of a program to memory to detect access to memory not allocated by the program; means for tracking allocations and deallocations of memory initiated by the program; means for storing, in response to detecting a deallocation of memory by the program, at least part of a state of a program stack at a time of the deallocation of memory; means for detecting, after the deallocation, access by the program to the memory associated with the deallocation of memory; and means for saving in permanent storage, in response to the detecting, the state of the program stack at the time of the deallocation.

In Example 43, the subject matter of Example 42 optionally includes means for storing, in response to detecting the deallocation of memory by the program, a lower bound and an upper bound of the memory associated with the deallocation; and means for storing a deallocation metadata pointer that points to an entry in a deallocation metadata table.

In Example 44, the subject matter of Example 43 optionally includes wherein the entry in the deallocation metadata table comprises: a thread identifier of a thread that performed the deallocation; an instruction pointer to an instruction that performed the deallocation; and the program stack at the time of the deallocation.

In Example 45, the subject matter of Example 44 optionally includes wherein the entry in the deallocation metadata table further comprises: branch information related to instructions executed by the program before the deallocation.

In Example 46, the subject matter of any one or more of Examples 42-45 optionally include wherein the state of the program stack comprises between five and fifty of most recent function calls executed by the program.

In Example 47, the subject matter of any one or more of Examples 42-46 optionally include means for providing an interface to configure how many of most recent function calls executed by the program are stored in the state of the program stack.

In Example 48, the subject matter of any one or more of Examples 42-47 optionally include wherein the state of the program stack comprises a name of a function and a line number within the function for each function call in the stored state of the program stack.

In Example 49, the subject matter of any one or more of Examples 42-48 optionally include means for causing the saved state of the program stack at the time of the deallocation to be presented on a display.

In Example 50, the subject matter of any one or more of Examples 42-49 optionally include means for storing, in response to the detecting the deallocation of memory by the program, branch information related to instructions executed by the program before the deallocation of memory.

In Example 51, the subject matter of Example 50 optionally includes wherein the branch information comprises a name of a function and a line number within the function for a branch taken during execution of the program.

In Example 52, the subject matter of Example 51 optionally includes wherein the branch information comprises between five and fifty most recent branches taken during the execution of the program.

In Example 53, the subject matter of any one or more of Examples 42-52 optionally include means for storing the state of the call stack at a time of the detecting access by the program to the memory associated with the deallocation.

In Example 54, the subject matter of any one or more of Examples 42-53 optionally include means for accessing a symbol table to identify function names in the state of the program stack.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for tracking memory usage, the system comprising:
 a memory protection system to:
  track access of a program to memory to detect access to memory not allocated by the program;
  track allocations and deallocations of memory initiated by the program:
  store, in response to detecting a deallocation of memory by the program, at least part of a state of a program stack at a time of the deallocation of memory;
  detect, after the deallocation, access by the program to the memory associated with the deallocation of memory;
  save in permanent storage, in response to the detection, the state of the program stack at the time of the deallocation;
  store, in response to detecting the deallocation of memory by the program, a lower bound and an upper bound of the memory associated with the deallocation; and
  store a deallocation metadata pointer that points to an entry in a deallocation metadata table, wherein the entry in the deallocation metadata table comprises:
   a thread identifier of a thread that performed the deallocation;
   an instruction pointer to an instruction that performed the deallocation; and
   the program stack at the time of the deallocation.

2. The system of claim 1, wherein the entry in the deallocation metadata table further comprises:
 branch information related to instructions executed by the program before the deallocation.

3. The system of claim 1, wherein the state of the program stack comprises between five and fifty of most recent function calls executed by the program.

4. The system of claim 1, wherein the memory protection system is further to:
 provide an interface to configure how many of most recent function calls executed by the program are stored in the state of the program stack.

5. The system of claim 1, wherein the state of the program stack comprises a name of a function and a line number within the function for each function call in the stored state of the program stack.

6. The system of claim 1, wherein the memory protection system is further to:
 cause the saved state of the program stack at the time of the deallocation to be presented on a display.

7. The system of claim 1, wherein the memory protection system is further to:
 store, in response to the detecting the deallocation of memory by the program, branch information related to instructions executed by the program before the deallocation of memory.

8. The system of claim 7, wherein the branch information comprises a name of a function and a line number within the function for a branch taken during execution of the program.

9. The system of claim 8, wherein the branch information comprises between five and fifty most recent branches taken during the execution of the program.

10. The system of claim 1, wherein the memory protection system is further to:
 store the state of the call stack at a time of the detect access by the program to the memory associated with the first deallocation.

11. The system of claim 1, wherein the memory protection system is further to:
 access a symbol table to identify function names in the state of the program stack.

12. A method for tracking memory usage, the method comprising:
 tracking, using a memory protection system, access of a program to memory to detect access to memory not allocated by the program;
 tracking allocations and deallocations of memory initiated by the program;
 storing, in response to detecting a deallocation of memory by the program, at least part of a state of a program stack at a time of the deallocation of memory;
 detecting, after the deallocation, access by the program to the memory associated with the deallocation of memory;
 saving in permanent storage, in response to the detecting, the state of the program stack at the time of the deallocation;
 storing, in response to detecting the deallocation of memory by the program, a lower bound and an upper bound of the memory associated with the deallocation; and
 storing a deallocation metadata pointer that points to an entry in a deallocation metadata table, wherein the entry in the deallocation metadata table comprises:
  a thread identifier of a thread that performed the deallocation;
  an instruction pointer to an instruction that performed the deallocation; and
  the program stack at the time of the deallocation.

13. The method of claim 12, wherein the state of the program stack comprises a name of a function and a line number within the function for each function call in the stored state of the program stack.

14. The method of claim 12, further comprising:
 storing, in response to the detecting the deallocation of memory by the program, branch information related to instructions executed by the program before the deallocation of memory.

15. The method of claim 14, wherein the branch information comprises a name of a function and a line number within the function for a branch taken during execution of the program.

16. The method of claim 15, wherein the branch information comprises between five and fifty most recent branches taken during the execution of the program.

17. The method of claim 12, further comprising:
storing the state of the call stack at a time of the detecting access by the program to the memory associated with the deallocation.

18. The method of claim 12, further comprising:
accessing a symbol table to identify function names in the state of the program stack.

19. At least one non-transitory machine readable medium including instructions that, when executed by a machine, cause the machine to:
track, using a memory protection system, access of a program to memory to detect access to memory not allocated by the program;
track allocations and deallocations of memory initiated by the program;
store, in response to detecting a deallocation of memory by the program, at least part of a state of a program stack at a time of the deallocation of memory;
detect, after the deallocation, access by the program to the memory associated with the deallocation of memory;
save in permanent storage, in response to the detection, the state of the program stack at the time of the deallocation;
store, in response to detecting the deallocation of memory by the program, a lower bound and an upper bound of the memory associated with the deallocation; and
store a deallocation metadata pointer that points to an entry in a deallocation metadata table, wherein the entry in the deallocation metadata table comprises:
a thread identifier of a thread that performed the deallocation;
an instruction pointer to an instruction that performed the deallocation; and
the program stack at the time of the deallocation.

20. The at least one non-transitory machine readable medium of claim 19, wherein the entry in the deallocation metadata table further comprises:
branch information related to instructions executed by the program before the deallocation.

21. The at least one non-transitory machine readable medium of claim 19, wherein the state of the program stack comprises between five and fifty of most recent function calls executed by the program.

22. The at least one non-transitory machine readable medium of claim 19, wherein the instructions further cause the machine to:
provide an interface to configure how many of most recent function calls executed by the program are stored in the state of the program stack.

* * * * *

UNITED STATES PATENT AND TRADEMARK OFFICE
CERTIFICATE OF CORRECTION

PATENT NO. : 10,198,335 B2
APPLICATION NO. : 15/274481
DATED : February 5, 2019
INVENTOR(S) : Gottschlich et al.

Page 1 of 1

It is certified that error appears in the above-identified patent and that said Letters Patent is hereby corrected as shown below:

In the Claims

In Column 17, Line 29, in Claim 1, delete "program:" and insert --program;-- therefor Signed and Sealed this
Fourteenth Day of April, 2020

Andrei Iancu
*Director of the United States Patent and Trademark Office*